June 20, 1950 — E. GATERMAN — 2,511,841
WINDROWING DEVICE
Filed Sept. 3, 1943 — 2 Sheets-Sheet 1
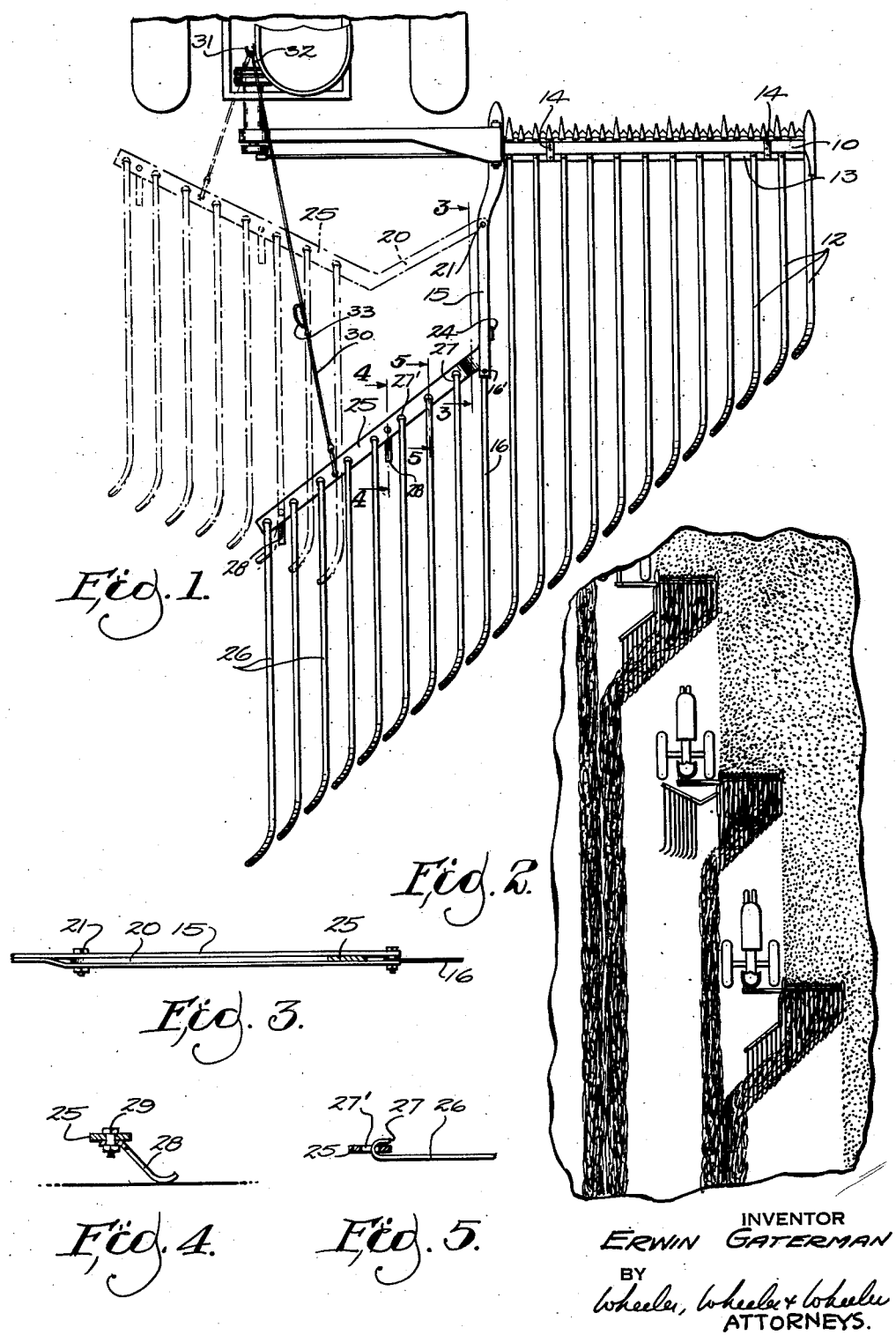
INVENTOR
ERWIN GATERMAN
BY
Wheeler, Wheeler & Wheeler
ATTORNEYS.

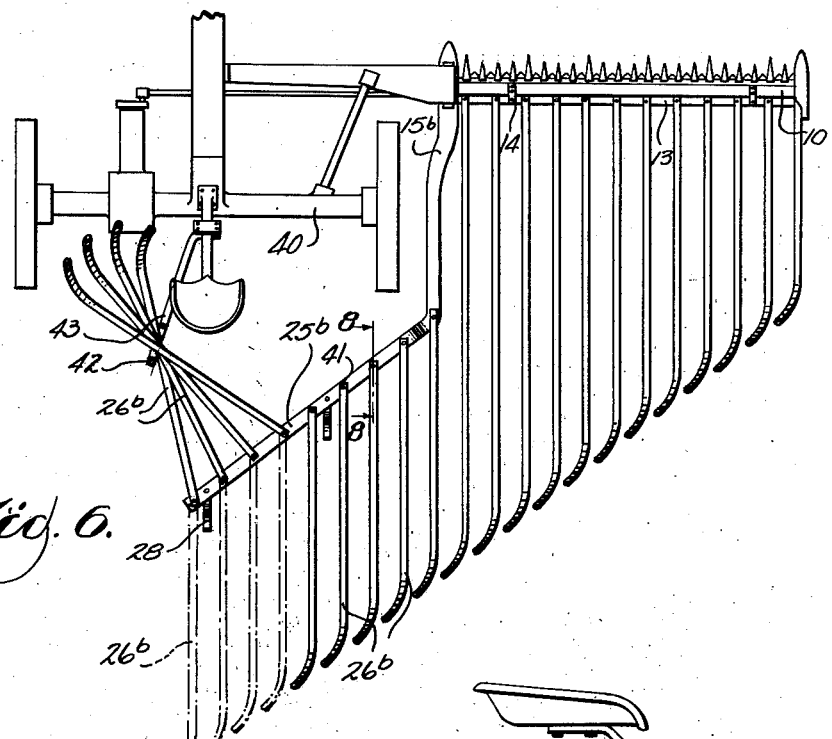

Patented June 20, 1950

2,511,841

UNITED STATES PATENT OFFICE 2,511,841

WINDROWING DEVICE

Erwin Gaterman, Manitowoc, Wis., assignor to Gaterman Manufacturing Company, Manitowoc, Wis., a partnership Application September 3, 1943, Serial No. 501,092

8 Claims. (Cl. 56—192)

My invention relates to improvements in windrowing attachments and methods, my primary object being to provide means for depositing windrows or piles in pairs, with those of each pair in sufficient proximity to be simultaneously gathered and loaded by a hay loader, or picked up with a sweep rake or a pick-up baling press, forage harvester, or combine and with the paired windrows so positioned as to avoid compaction by the wheels of the mower or pick-up devices, or by horses if either vehicle is horse drawn.

A further object is to provide an intermittingly operable windrow placing mechanism which can be employed as an auxiliary to any ordinary windrowing device or attachment, whereby to produce paired windrows, said placing means, when so used, being operative during the formation of one windrow and inoperative during the formation of the next or alternate windrow.

In some mowing machines the power transmission mechanism and sickle bar are located in front of the axial line of the rear axle. In others, particularly in some machines of the tractor type, they are located rearwardly of said line. These variations made desirable corresponding variations in the structure of my intermittingly operable windrow placing device, and it is therefore a further object to provide means whereby, with slight modifications, my invention may be adapted to the requirements of any mowing machine or any windrower.

Further objects will be apparent from the following description.

In the drawings:

Figure 1 is a plan view of my windrow placing device as it appears when connected with an ordinary windrowing attachment for a mowing machine, a fragment of which is also illustrated.

Figure 2 is a diagram illustrating either the same machine while cutting three successive swaths, or three machines of the same type following each other in succession and illustrating the manner in which the windrows are paired.

Figure 3 is a sectional view, drawn to line 3—3 of Figure 1.

Figure 4 is a detail sectional view drawn to line 4—4 of Figure 1.

Figure 5 is a detail sectional view drawn to line 5—5 of Figure 1.

Figure 6 is a view similar to Figure 1, showing a modification of my invention particularly intended for use in connection with horse drawn machines of the type in which the sickle bar and its power transmitting connections are located in front of the wheel axle.

Figure 7 is a detail of the driver's seat equipped with a supporting arm for the inoperative windrowing slats indicated by dotted lines in Figure 6.

Figure 8 is a fragmentary detail view in plan showing a preferred modified embodiment in which the slats are illustrated in full lines in their retracted positions and in dotted lines in their operative position.

Figure 9 is a view of a third modification adapted for use with any type of mowing machine, and in which the auxiliary windrowing slats may be completely detached, handily and quickly, on completion of a windrow, and as quickly replaced for use while mowing the next swath.

Like parts are identified by the same reference characters throughout the several views.

In the embodiment of my invention shown in Figure 1, a mowing machine has its sickle supporting guard bar 10 back of the laterally extended line of the rear axle. The windrowing slats 12 of the main windrower may have their front ends secured to a connector bar 13, which in turn is attached to the guard bar 10 by links 14, as disclosed in the former patent to William Gaterman, No. 2,121,428, dated June 21, 1938.

The inner end of the connector bar 13 has a rearwardly extending arm 15, which is not elbowed as illustrated in said former patent, but to the rear end of which a windrowing slat 16 is pivoted at 16, and over which final delivery of a windrow formed by the slats 12 may be delivered.

The auxiliary windrow placing device shown in Figure 1 has an elbowed draw bar having one arm 20 normally interposed between the upper and lower members of the rear portion of the arm 15, (Figure 3), with its front end pivoted thereto at 21. Near the rear end of the arm 20 it is normally in contact with a stop 24, and the other arm of the draw bar extends laterally and obliquely toward the rear. Auxiliary slats 26, also having upturned rear ends, are each loosely pivoted to the arm 25 of the draw bar, preferably to the upper surface of said arm by hooks 27 adapted to be manipulated through apertures 27' in the draw bar. These auxiliary slats 26 are adapted to serve as a continuation of the row of slats 12 and 16, whereby the windrow may be deposited substantially at the rear of the left hand wheel track of the mowing machine.

The arm 25 of the draw bar is offset upwardly where it joins arm 20 and may be supported above the stubble by one or more runner shoes 28, each of which is pivoted to the draw bar at 29, (Figure 4). These shoes support the arm 25 at a substantial distance above the ground, and not only aid the draw bar in clearing obstructions, but also prevent that bar from dragging on the ground and crushing the stubble, it being important to leave the stubble in a standing position to the fullest possible extent in order to support superposed windrows sufficiently above the ground to permit air circulation and prevent the material from absorbing moisture from the ground.

The outer or left hand end portion of the arm 25 of the draw bar is connected with the frame of the mowing machine by a rope, cable, or pole 30, the inflexible connection being preferred when it is desired to be able to hold the position of the parts while backing. To facilitate so connecting the cable or pole with the draw bar in two different positions, the mowing machine frame or its seat is provided with a hook 31. The cable (if a flexible connector is used) has an end loop 32 and an intermediate loop 33, either one of which may be engaged with the hook. When the end loop 32 is so engaged the auxiliary windrow placing device will occupy the position in which it is shown by full lines in Figure 1, and will be operative as above explained to place the windrow beyond the track of the left hand wheel. But to engage the loop 33 with the hook 31, it is necessary to swing the draw bar forwardly to the position in which it is shown by dotted lines in Figure 1, and in this position all of the auxiliary windrowing slats 26 will be supported out of the path of a windrow delivered by the slats 12 and 16, and will be temporarily rendered inoperative.

Thereupon a windrow will be deposited in the vicinity of the track of the right hand wheel of the mowing machine, as indicated in the central portion of the diagram shown in Figure 2. On the next round the draw bar and the auxiliary slats may be restored to their normal position, as indicated by full lines in Figure 1, and the windrow then formed will be delivered in proximity to the one immediately preceding it, as indicated in the lower portion of the Figure 2 diagram.

The pivotal connection of the draw bar at 21 allows the outer end of the draw bar to be drawn forwardly out of the path of the windrow delivered by the main windrowing attachment.

The pivotal connections of the auxiliary slats are preferably obtained by providing the front ends of these slats with terminal hooks 27 which may be manipulated through apertures 27' in the draw bar to facilitate the removal and replacement of slats, whereby if any slat becomes broken it may be quickly replaced. This form of connection also provides means whereby the number of these auxiliary slats may be varied in accordance with varying conditions to change the proximity of the windrows of each pair. In Figure 1, I have shown eight auxiliary slats 26, and when these are employed, the right hand windrow of each pair will be deposited in close proximity to the one at the left, as shown in Figure 2. But if one or two of the left hand slats 26 are removed the distance between the windrows of each pair will be correspondingly increased.

In Figure 6 I have illustrated a form of construction particularly adapted for use in connection with mowing machines which have their guard bars and sickles in front of the laterally extended line of the axle 40. In such cases it is not convenient to use the pivoted draw bar shown in Figure 1 in the desired proximity to the wheels, and I therefore provide the connector bar 13 with an elbowed arm 15b having an oblique extension 25b which serves as a draw bar for the auxiliary slats 26b. The slats 26b are connected with the draw bar by pivot bolts 41, whereby these slats may be swung between full and dotted line positions indicated in Figure 6. When folded as shown in full lines they are supported on a shelf-like arm 42 carried by any suitable portion of the mowing machine frame, preferably the post of the driver's seat. The arm 42 has a depression 43 to receive the folded slats and prevent them from accidentally slipping therefrom. The pivotal connections of the slats 26b, or the flexibility of the slats themselves, allow all of the slats to swing to the rest position which they occupy when so supported.

In Figures 8 and 9 I have shown modified embodiments in which the auxiliary slats 45 and 45a instead of, or in addition to, being detachable by unhooking them individually, may be moved to inoperative positions in a group.

In the construction shown in Figure 8 the auxiliary slats 45a are loosely pivotally connected to an auxiliary draw bar 46a pivoted at 47a to the inclined draw bar 25c. By means of a controlled link 50 which may be flexible, as a rope or chain, or may be rigid, as a pole, the auxiliary draw bar 46a and its associated auxiliary slats 45a may be swung between the inoperative position shown in full lines in Figure 8 and the operative position shown in dotted lines.

The Figure 8 construction is the preferred arrangement. However, in each of the constructions shown in Figures 8 and 9 means is suggested whereby groups of slats may be simultaneously placed in operative position or withdrawn from operative position.

In Figure 9 I have indicated a third modification, in which an elbowed arm 15c is employed, which is similar to the arm 15b in Figure 6, but its inclined draw bar portion 25c has several of the auxiliary slats 26c pivotally connected with the draw bar by hooks 27c in that portion of the draw bar nearest the elbow, whereas an outer set of slats 45 are connected by similar hooks to a connector bar 46 linked by hook-shaped members 47 to the draw bar 25c, the latter bing provided with stop blocks 48 to prevent the hooks from slipping off. With this construction the connector bar 46, with its assembly of auxiliary slats 45, may be completely removed from the draw bar 25c and deposited on the ground when not in use or carried on any suitable part of the moving machine frame.

In each embodiment illustrated, the number of auxiliary slats in use may be varied and the windrows paired in any desired degree of proximity to each other. In each embodiment the auxiliary set of slats or any desired number of them can be handily and quickly adjusted into and out of operative relation to the main set of windrowing slats. The slats may be connected with the draw bar by any suitable means adapted to the purpose of allowing the slats to be removed in certain cases or folded in other cases, or simply drawn out of operative relation to the main windrowing attachment. Therefore I do not limit the scope of my invention to the particular connections illustrated.

Buncher attachments to windrowers are known, and there are also other means of depositing crops in bunches or stacks, instead of in windrows. Particularly from the standpoint of the method herein disclosed it will be apparent to those skilled in the art that many of the advantages of the invention may be achieved by depositing bunches, as well as windrows, in pairs to increase the space between rows and to facilitate and reduce the cost of picking up the crops from the field.

I claim:

1. For use with a mowing machine provided with a windrow forming mechanism, the combination of a draw bar support, a draw bar pivoted to the support and extending along an oblique line laterally and rearwardly with reference to said mechanism, and a series of auxiliary windrow shifting members connected with said bar and adjustable therewith into and out of a position to receive windrows from said mechanism, and means, connected with the mowing machine, for supporting said bar and shifting members in an inoperative position.

2. For use with a mowing machine provided with a windrow forming mechanism, the combination of a draw bar support, a draw bar pivoted to the support and extending laterally from the delivery side of the windrow forming mechanism with a rearward inclination, a series of auxiliary windrow shifting members connected with said bar, and a manually adjustable connection between the bar and the mowing machine for holding the bar and shifting members in either operative or inoperative position.

3. For use with a mowing machine provided with a windrow forming mechanism, the combination of a draw bar support, a draw bar pivoted to the support and extending laterally from the delivery side of the windrow forming mechanism with a rear inclination, a set of auxiliary windrow shifting members, connected with said bar and adjustable into and out of operative position with reference to the windrow forming mechanism, a supporting member connected with the mowing machine, and from which the windrow shifting members may be carried in their inoperative position.

4. For use with a mowing machine provided with a windrow forming mechanism, the combination of a draw bar support, a draw bar pivoted to the support and extending laterally from the delivery side of the windrow forming mechanism with a rearward inclination, a series of auxiliary windrow shifting members, connected with said bar and adjustable therewith into and out of operative position, and means, connected with the mowing machine, for supporting said bar and shifting members in an inoperative position, said windrow shifting members being detachably hooked to the bar.

5. In a mowing machine having sickle and guard bars at one side of its walls, and a set of windrow forming slats connected with the guard bars and normally trailing therefrom, a draw bar mounted in the rear of the mowing machine wheels and provided with windrow receiving and guiding slats adapted in one position to receive and laterally deliver a freshly formed windrow from the first mentioned set of slats, and manually controlled means for moving the draw bar and its slats into and out of a position of lateral extension of the first mentioned slats to provide for alternate windrow delivery along at least two different lines parallel to the swath and laterally offset therefrom.

6. The combination with a mowing machine for propelling a windrow-forming mechanism, of a draw bar extending rearwardly from one side of the mowing machine adjacent such mechanism and laterally behind the machine, a series of auxiliary windrow shifting members carried by said draw bar in locations to receive and move laterally a windrow formed by said mechanism, said members having a loose pivotal connection with said bar, and a support carried by the mowing machine and onto which the respective members are individually movable from their normal operative trailing positions behind said bar.

7. The combination with a tractor and a supporting member extending rearwardly at one side of the tractor, of a windrow-positioning device disposed behind the tractor and comprising a draw bar extending laterally from said member, slats with curved free ends each pivotally connected with the draw bar, and a pivotal connection for one end of said draw bar, and an adjustable connection from the tractor to the other end of said draw bar, the draw bar being movable under tension of the last mentioned connection to operative windrowing position and being yieldable upon the releasing of said last mentioned connection to inoperative position in the course of movement of said tractor.

8. For use with a mowing machine provided with a windrow forming mechanism, a draw bar support, a draw bar pivotally attached thereto and extending outwardly therefrom, a plurality of auxiliary windrow shifting members pivotally connected with said draw bar and extending outwardly therefrom, and means operatively connected to said draw bar for adjusting the position of the draw bar with respect to the draw bar support.

ERWIN GATERMAN.

REFERENCES CITED

The following references are of record in the file of this patent:

UNITED STATES PATENTS

| Number | Name | Date |
|---|---|---|
| 210,650 | Weichhart | Dec. 10, 1878 |
| 358,735 | Doan | Mar. 1, 1887 |
| 394,198 | McGovney | Dec. 11, 1888 |
| 420,329 | Bovee | Jan. 28, 1890 |
| 422,167 | Todd | Feb. 25, 1890 |
| 736,450 | Sharpe, Jr. | Aug. 18, 1903 |
| 765,218 | Whitely | July 19, 1904 |
| 773,208 | Ketelsen | Oct. 25, 1904 |
| 885,157 | Horland | Apr. 21, 1908 |
| 1,419,051 | Hinton | June 6, 1922 |
| 1,688,137 | Wilkes et al. | Oct. 16, 1928 |
| 1,792,691 | Harris et al. | Feb. 17, 1931 |
| 1,823,387 | Campbell | Sept. 15, 1931 |
| 1,906,498 | Templeton | May 2, 1933 |
| 1,948,927 | Lindgren et al. | Feb. 27, 1934 |
| 2,133,905 | Rund, Jr. | Oct. 18, 1938 |

FOREIGN PATENTS

| Number | Country | Date |
|---|---|---|
| 10,450 | Great Britain | 1910 |
| 15,575 | Denmark | Jan. 25, 1912 |